United States Patent
Ueda

[19]

[11] Patent Number: 6,006,150
[45] Date of Patent: Dec. 21, 1999

[54] COMMUNICATIONS DEVICE FOR CONTROL DEVICE

[75] Inventor: Yoshiaki Ueda, Fuji, Japan

[73] Assignee: Jatco Corporation, Japan

[21] Appl. No.: 08/762,738

[22] Filed: Dec. 10, 1996

[30] Foreign Application Priority Data

Dec. 11, 1995 [JP] Japan ................................. 7-346027

[51] Int. Cl.$^6$ ..................................................... H04J 3/02
[52] U.S. Cl. ............................... 701/53; 701/51; 701/58; 701/65; 180/336; 477/78; 370/85
[58] Field of Search ................................ 701/51, 53, 55, 701/58, 62, 65; 74/473.1, 433.21; 180/336, 337; 477/34, 78

[56] References Cited

U.S. PATENT DOCUMENTS

| | | | |
|---|---|---|---|
| 3,828,130 | 8/1974 | Yamaguchi | 178/69.5 R |
| 4,706,245 | 11/1987 | Suzuki et al. | 370/85 |
| 4,788,890 | 12/1988 | Anderson | 74/851 |
| 4,821,262 | 4/1989 | Futami | 370/85 |
| 4,996,965 | 3/1991 | Onari et al. | 123/492 |
| 5,052,246 | 10/1991 | Yamaguchi | 74/866 |
| 5,138,873 | 8/1992 | Amano | 73/118.1 |
| 5,454,001 | 9/1995 | Nagatani et al. | 371/68.2 |

Primary Examiner—Jacques H. Louis-Jacques
Assistant Examiner—Arthur D. Donnelly
Attorney, Agent, or Firm—Rossi & Associates

[57] ABSTRACT

A communications device for a control device is provided which includes a signal line communicating with the control device, and a transmitter that transmits a pulse signal including digital information to the control device through the signal line. The transmitter varies a duty ratio of the pulse signal so that the duty ratio corresponds to the logical value 1/0 of the digital information. The control device reads a binary signal from the signal line at a predetermined frequency based on a first processing program, and processes the binary signal according to the first processing program. The control device detects passage of a leading edge of the pulse signal from a change in the received binary signal, and reproduces the digital information based on the binary signal read at a time when a first predetermined time elapses after the passage of the leading edge of the pulse signal is detected. The first predetermined time is set to be intermediate between the varied duty ratios. The control device detects an abnormality in the communication by detecting that at least one of the rise and fall of the binary signal disappears.

6 Claims, 6 Drawing Sheets

COMMUNICATIONS DEVICE FOR CONTROL DEVICE

BACKGROUND OF THE INVENTION

1. Field of the Invention

The present invention relates to a communications device for a control device, which transmits digital information from a transmitter to the control device through a signal line.

2. Description of the Prior Art

A control system for an automatic transmission that has been practically used includes a control unit provided with a microcomputer circuit and exclusively used for controlling the automatic transmission. This control unit controls the operation of solenoid valves provided in the automatic transmission according to a predetermined processing program, so as to subtly control switching or shifting of gear positions of the transmission and setting of an oil pressure level used for shifting.

To the automatic transmission control unit, there are connected a plurality of sensors provided in the automatic transmission and engine of the vehicle. Further, the automatic transmission control unit receives digital information through signal lines from a number of control devices, such as an engine control unit for controlling the engine.

The automatic transmission control unit determines the optimum shifting time based on input information received from these sensors and surrounding equipment, and changes electric signals to be outputted to solenoids to thus cause the automatic transmission to perform a suitable shifting operation.

When the automatic transmission control unit receives digital information from switches, sensors and other control devices, the voltage of the signal line is normally switched between two levels that correspond to logical values 1/0 of the digital information.

Japanese laid-open Patent Publication No 1-172668 discloses a communications device for transmitting a digital signal from the automatic transmission control unit to the engine control unit. In this device, two microcomputer circuits (operation units of the automatic transmission control unit and engine control unit) communicate with each other through a signal line provided with a simple interface circuit, and the microcomputer circuit on the transmitter side forms a binary signal in the signal line, which signal is then directly read by the microcomputer circuit on the receiver side.

The microcomputer circuit on the transmitter side also detects the voltage level of the signal line outside the interface circuit, and compares the detected level with the output (1/0) of the transmitter-side microcomputer circuit, so as to determine an abnormality or failure of the signal line when the detected voltage level does not normally correspond to the output of the transmitter.

Where the voltage level of the signal line is simply switched between two levels corresponding to the logical values 1/0 of the digital information, the communications device as disclosed in Japanese laid-open Patent Publication No. 1-172668 only requires simple interface circuits on the transmitter side and receiver side, and is able to check the content of communication on the transmitter side. The receiver, however, is not able to determine whether the transmitted digital information is correct or not, based on the 1/0 digital information read from the signal line.

Namely, the receiver is not able to discriminate 0 V from the signal line short-circuited to the ground level, from L (low) level of a normal 1-bit signal, nor be able to discriminate an abnormal voltage level due to breakage of the interface circuit on the transmitter side or receiver side, from H (high) level of the normal 1-bit signal.

If a communications device is adapted to transmit digital information with 1/0 logical values corresponding to two voltage levels that are between the power supply voltage and the ground potential, the communication abnormality can be judged when a voltage outside these two voltages is detected in the signal line.

In this communications device, however, the transmitter requires an interface circuit for forming an analog voltage corresponding to the logical value 1/0 of the digital information, and the receiver requires an interface circuit for reading the digital information from the analog voltage and an abnormality detecting circuit for detecting an abnormality of the analog voltage.

In another communications device which is provided with two communication lines through which the same digital information is transmitted in parallel with each other, abnormality in the communication can be judged when the information transmitted through one of the lines is different from that transmitted through the other line.

In this case, however, each of the transmitter and receiver needs two sets of interface circuits, and the microcomputer circuit of the receiver needs to have two input ports. This is incompatible with recent requirements for reduced size of equipment and simplified wiring.

It is also possible to apply a method of so-called serial communication in which a synchronization signal of a given frequency is produced in a communication line, and a binary signal corresponding to the logical value 1/0 of the digital information is transmitted in association with the synchronization signal.

In this case, however, a special interface circuit and abnormality detecting circuit need to be additionally provided on the receiver side, as in the case where analog voltages are used. Since the synchronization signal does not match the frequency of program processing effected in the control device on the receiver side, the receiver-side control device cannot directly read the binary signal from the communication line. Accordingly, a read circuit (shift register) is needed which operates in synchronization with the synchronization signal to reproduce the digital information from the binary signal, and retain the information until the time when the receiver-side control device is ready to read the reproduced information. Further, an additional abnormality detecting circuit is needed for detecting that the synchronization signal ceases to be transmitted.

SUMMARY OF THE INVENTION

It is an object of the present invention to provide a communications device for a control device, which includes simple interface circuits on its transmitter and receiver sides, and is able to detect abnormalities of a signal line and interface circuits without requiring any special circuit for that purpose.

To accomplish the above object, there is provided a communications device for a control device, comprising: a signal line communicating with the control device; and a transmitter that transmits a pulse signal including digital information to the control device through the signal line, the transmitter varying a duty ratio of the pulse signal so that the duty ratio corresponds to a logical value 1/0 of the digital information. The control device reads a binary signal from the signal line at a predetermined frequency based on a first processing program, and processes the binary signal according to the first processing program. The control device includes leading edge detecting means for detecting passage of a leading edge of the pulse signal from a change in the received binary signal; and reproducing means for reproducing the digital information based on the binary signal read at a time when a first predetermined time elapses after the passage of the leading edge of the pulse signal is detected, the first predetermined time being set to be intermediate between the varied duty ratios.

In the above-described communications device, the control device operates at a frequency set in the processing program designed for this device, and directly reads the binary signal in the signal line. The control device then identifies the logical value 1/0 of the binary signal at a time when the first predetermined time elapses, without being synchronized with the pulse signal. Accordingly, the time when the first predetermined time begins to be counted or the time when the duty ratio of the pulse signal is identified has no direct relationship with the time when the binary signal rises in the signal line. Thus, no circuit for reading the content of communication in synchronization with the pulse signal needs to be provided outside a portion (operation unit) for performing the program.

Since the control device reads the binary signal in the signal line according to the first processing program, there is no need to provide a shift register that operates in synchronization with the binary signal of the signal line, or a special interface circuit for identifying the duty ratio of the binary signal from the signal line. Further, the control device receives the binary signal itself, rather than the digital information separated from the binary signal in the signal line, and therefore is able to determine the normality or abnormality of the communication by detecting the binary signal and processing the signal according to the program stored therein. Thus, the control device does not need to receive any signal other than the binary signal for detecting an abnormality, nor requires any circuit for forming a signal exclusively used for detecting an abnormality.

Accordingly, the number of signal ports of an operation unit of the control device can be reduced, and the whole circuit construction is simplified, thus providing a light, small-sized, highly reliable control device capable of detecting a communication abnormality.

In one preferred form of the invention, the transmitter continuously forms the pulse signal at a substantially constant interval in the signal line, and periodically raises the binary signal in the signal line. In this communications device, almost periodic rises of the binary signal are formed in the signal line in the timing conveniently set by the transmitter. Since the control device detects the rises of the binary signal in the timing on the first processing program, without synchronizing the rises of the binary signal with the proceeding of the first processing program, each of the periodic rises of the binary signal is detected at a time that is non-uniformly delayed with respect to the leading edge of each pulse of the pulse signal. Thus, the time when the first predetermined time starts being counted and the time when the duty ratio of the pulse signal is identified have no direct relationship with the frequency of the binary signal in the signal line.

Since the rises and falls of the binary signal appear alternately in the signal line irrespective of the logical value 1/0 of the digital information, the control device is able to detect an abnormality in the communication (abnormality or fault of the whole system including the transmitter, signal line, interface circuit of the receiver, power supply and others), by detecting that at least one of the rise and fall of the binary signal disappears.

Since the control device receives the binary signal itself, but not the digital information separated from the binary signal, the control device can directly detect the above abnormality by analyzing the received binary signal according to the processing program, without relying on an external abnormality detecting circuit.

In sum, the normality or abnormality in the communication can be determined by utilizing the periodic rises of the pulse signal. This eliminates a need to provide an abnormality detecting circuit on the receiver side for detecting an abnormal voltage as in the case where two voltage bands that are intermediate between the power supply voltage and the ground potential are set so as to correspond to the logical values 1/0 of the digital information, and the abnormality of the communication is judged when the detected voltage is outside these two voltage bands.

Further, the microcomputer circuit of the receiver only needs one input port. Namely, there is no need to provide two sets of communication lines and interface circuits as in the case where the same digital information is transmitted through two communication lines in parallel with each other, and the abnormality in the communication is determined when the information received from one of the communication lines is different from that received from the other communication line.

Moreover, there is no need to provide a read circuit (shift register) which operates in synchronization with a synchronization signal and separates the digital signal from the synchronization signal, and an abnormality detecting circuit for detecting that the synchronization signal ceases to be transmitted, as in the case where the synchronization signal having a fixed frequency is produced in the communication line, and the digital information is transmitted in association with the synchronization signal.

In another preferred form of the invention, the control device controls a first equipment installed on a motor vehicle according to the first processing program, and the transmitter controls a second equipment installed on the vehicle according to a second processing program independent of the first processing program, and forms the pulse signal in the signal line according to the second processing program.

In the communications device as described above, the transmitter forms the binary signal in the signal line while it is not controlling the second equipment installed on the vehicle according to the second processing program, and the control device reads the digital information from the binary signal in the signal line while it is not controlling the first equipment installed on the vehicle.

The operations of the transmitter and control device are not synchronized with each other, and the transmitter performs processing of the output signal in its specific timing while the control device performs processing of the input signal in its specific timing. A timer (so-called software time) on the first processing program provides a loose synchronized condition that is at least required to enable the communication between the transmitter and control device.

Since the original digital data are reproduced from the binary signal by only using a simple software timer incorporated in the first processing program, without requiring accurate synchronization with respect to periodic rises of the pulse signal, desired communication processing and detection of communication abnormalities can be achieved without causing almost no influences on the proceeding of the processing program designed for controlling the first equipment installed on the vehicle.

Further, the transmitter can form the pulse signal in the timing conveniently set by the second processing program, without taking account of a constant or fixed frequency or the convenience of the receiver, the formation of the pulse signal hardly affect the proceeding of the second processing program designed for controlling the second equipment installed on the vehicle.

In a further preferred form of the invention, the control device further comprises diagnosing means for detecting a communication abnormality when the change in the binary signal is not detected for a second predetermined time that is set to be longer than the maximum interval between periodic rises of the binary signal in the signal line.

In the communications device as described above, the control device observes the presence of changes in the binary signal according to the first processing program, and makes a judgement that there is a communication abnormality if no change in the binary signal appears until the second predetermined time elapses after the binary signal changes (at least one of rise and drop of voltage level) last time. In this arrangement, the communication abnormality can be judged by executing a few steps incorporated in the processing program, without requiring addition of a special external circuit or useless interrupt processing, nor causing any influence on the proceeding of the processing program originally designed for controlling the equipment installed on the vehicle.

In a still further form of the invention, the transmitter comprises an engine control unit for controlling an operation of an engine, and the control device comprises an automatic transmission control unit for controlling an operation of an automatic transmission, and digital information that informs whether the vehicle is running at a high altitude or a low altitude is transmitted from the engine control unit to the automatic transmission control unit.

In the communications device as described above, the digital information that informs whether the vehicle is running at a high altitude or a low altitude is transmitted from the engine control unit to the automatic transmission control unit. Whether the vehicle is running at the high altitude or low altitude changes the amount of the air supplied to the engine and has an influence on the engine output. Namely, the engine output is reduced at a high altitude than at a low altitude even with the same throttle opening. The automatic transmission control unit controls the automatic transmission by lowering the oil pressure level during the shifting operation at a high altitude, so as to avoid shocks upon engagements of relevant clutch and brake. Thus, the content of controlling the automatic transmission is changed depending upon whether the vehicle is running at a high altitude or low altitude, thereby eliminating inconveniences otherwise encountered in the operation of the automatic transmission due to the level of the atmospheric pressure.

BRIEF DESCRIPTION OF THE DRAWINGS

The invention will be described in greater detail with reference to a certain preferred embodiment thereof and the accompanying drawings, wherein.

DETAILED DESCRIPTION OF THE PREFERRED EMBODIMENTS

Figure 1:
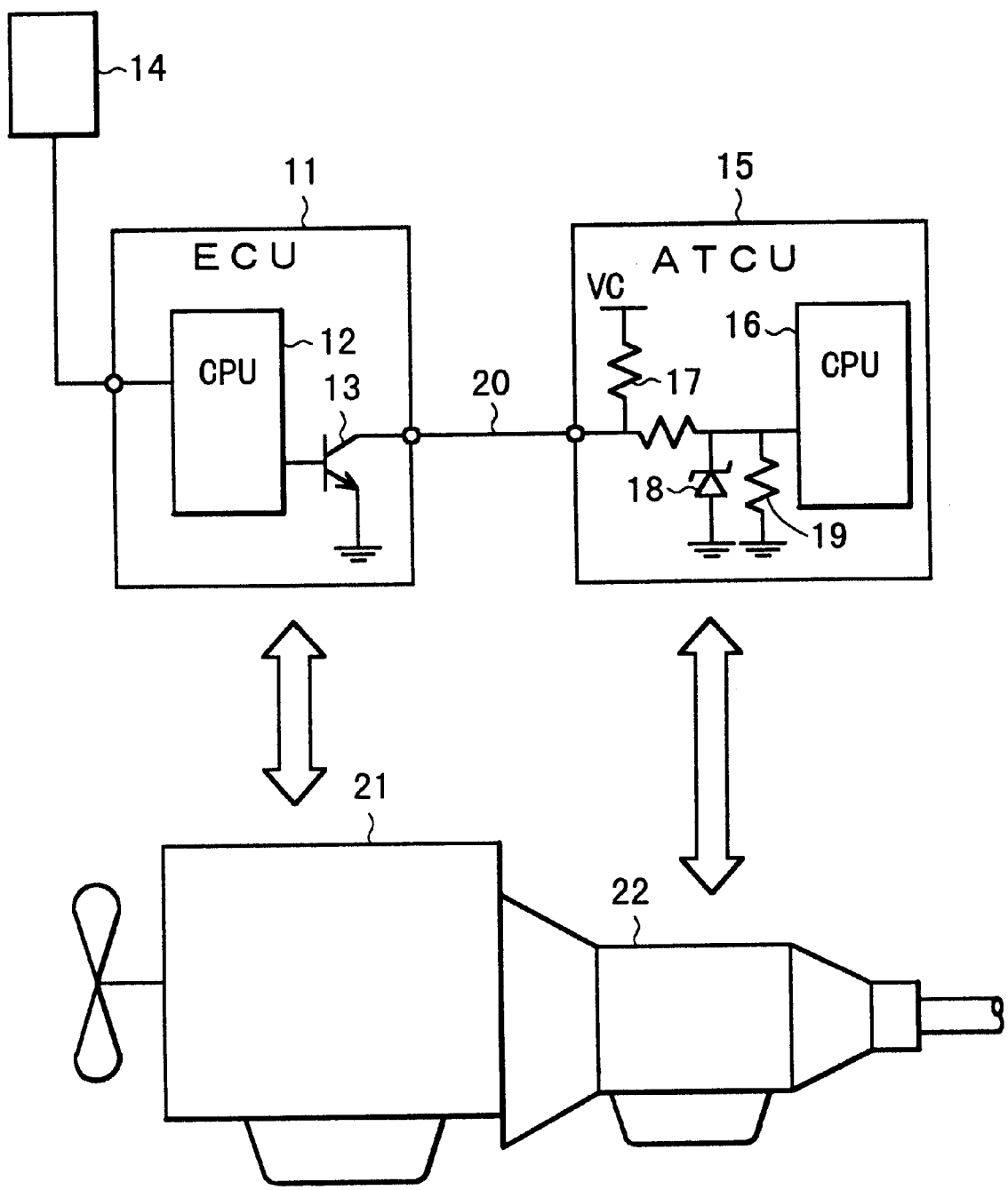
FIG. 1 is a view showing a communications device according to one embodiment of the present invention.
Figure 2A:
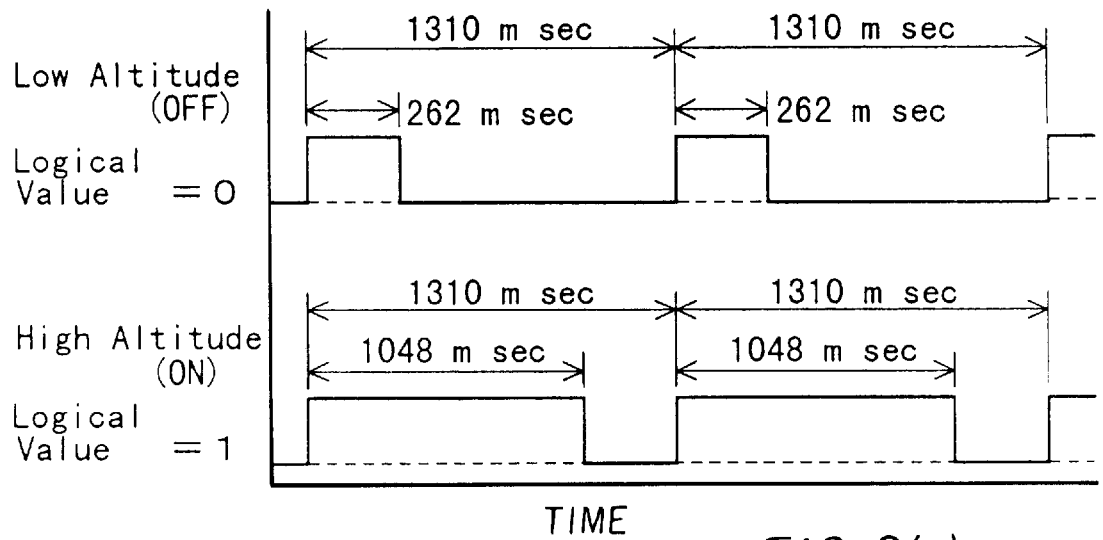
FIG. 2 is a view for explaining output/input pulse waveforms.
Figure 2B:
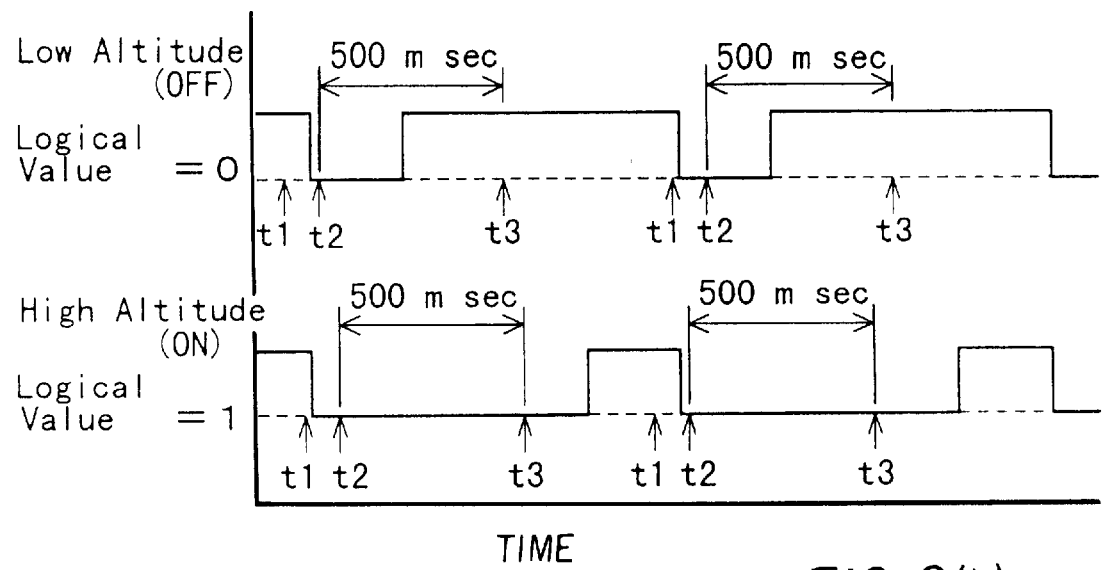
Figure 3:
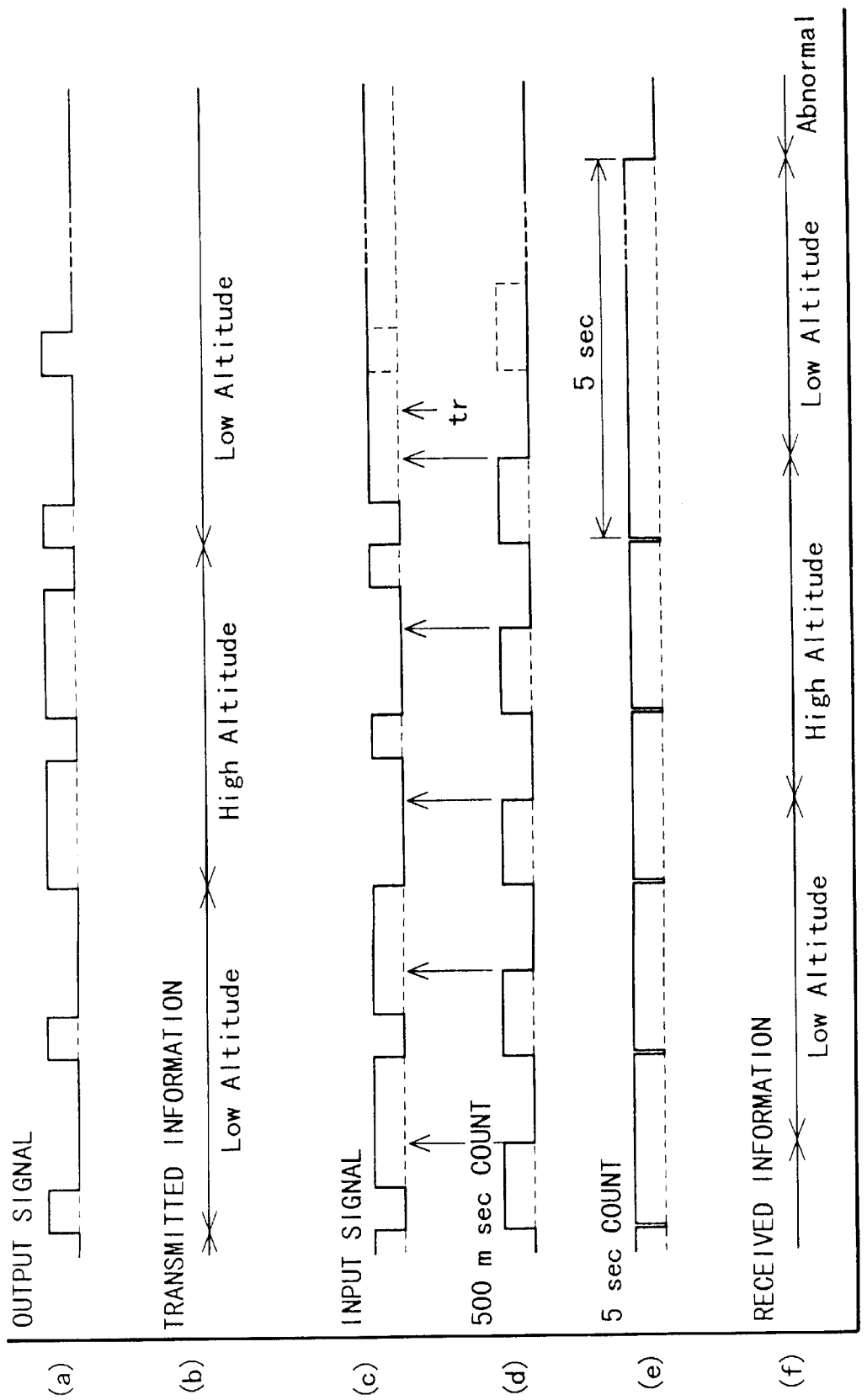
FIG. 3 is a communication time chart employed by the communications device of FIG. 1.
Figure 4:
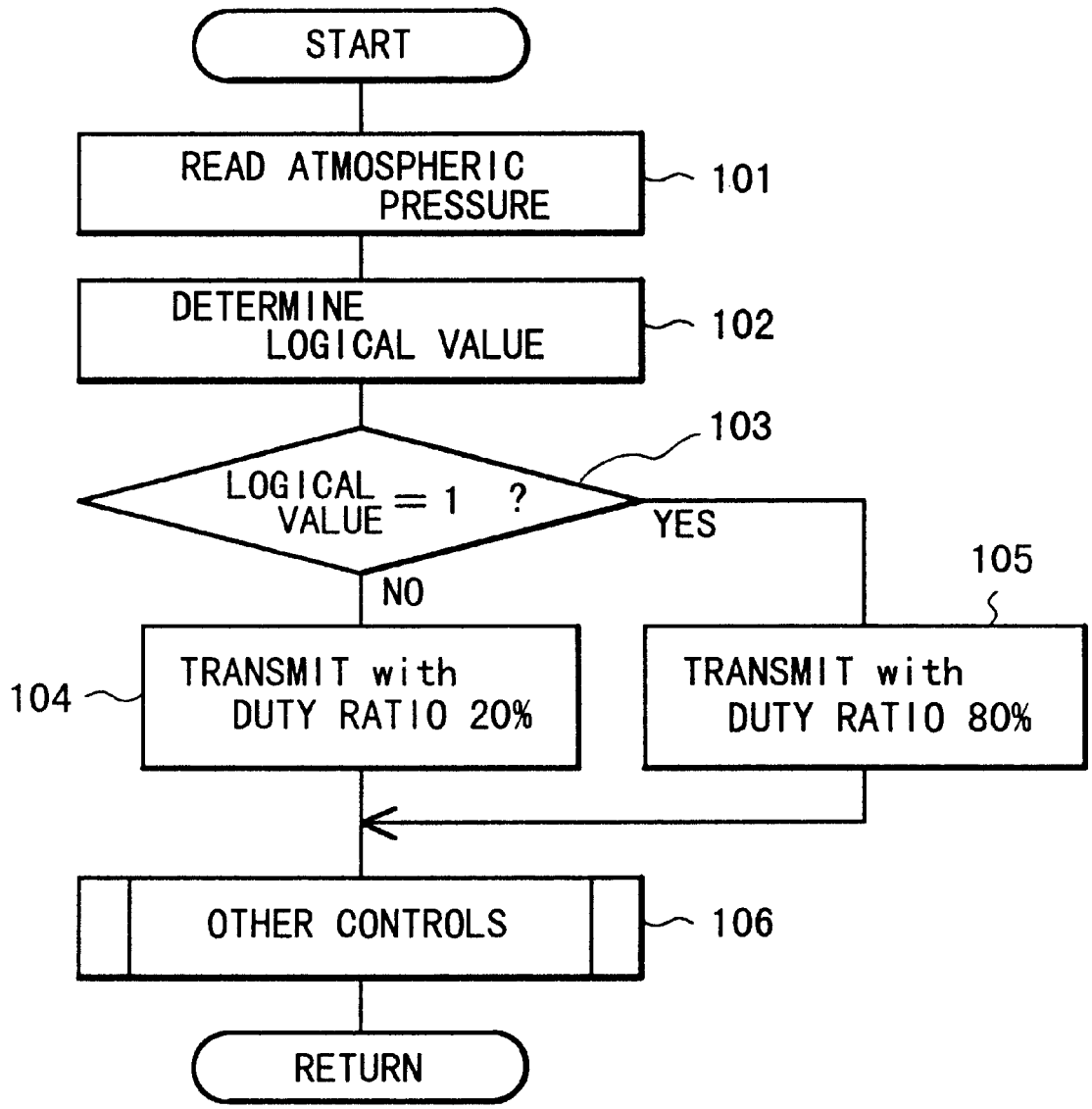
FIG. 4 is a flow chart of a processing program performed on the transmitter side.
Figure 5:
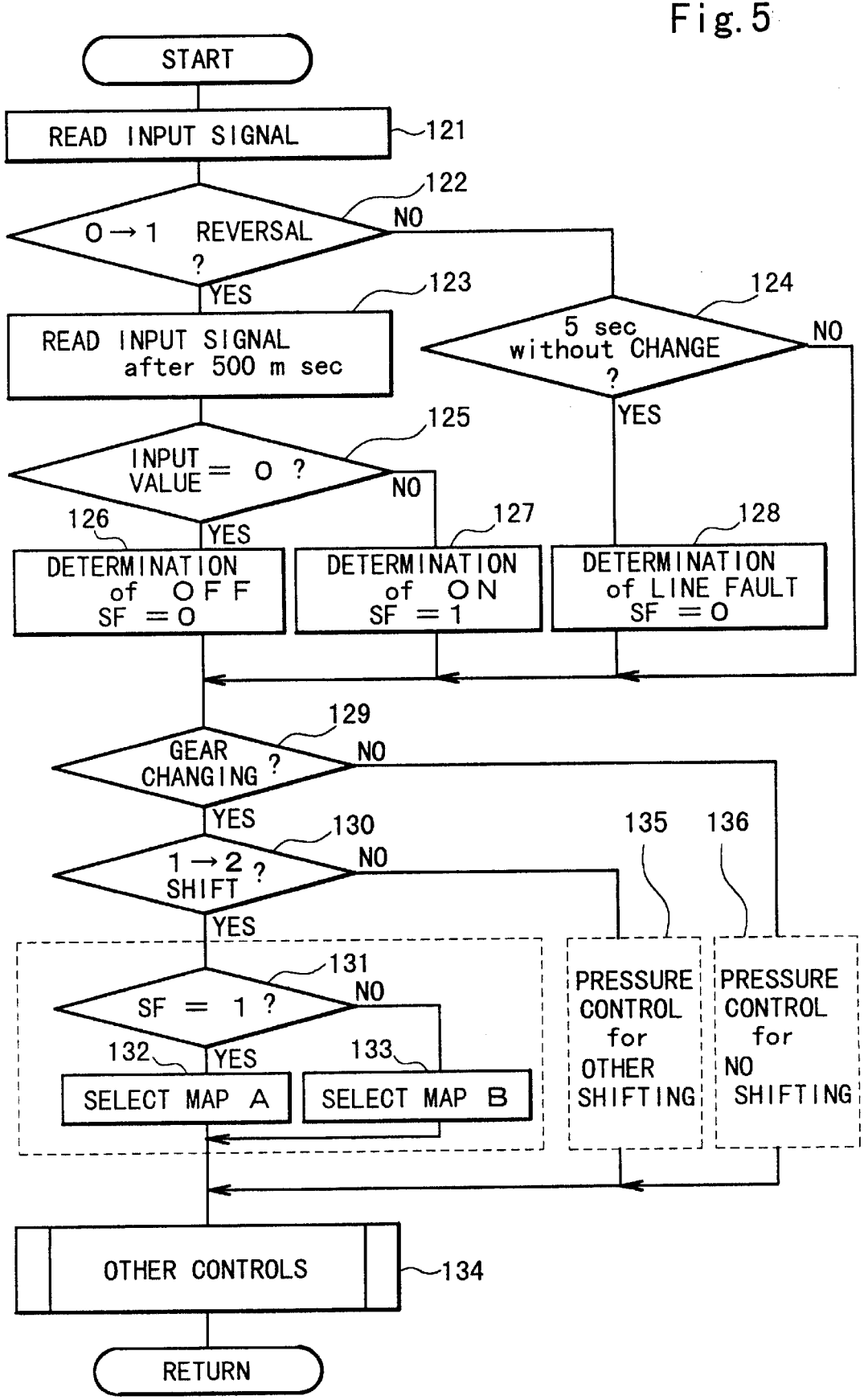
FIG. 5 is a flow chart of a processing program performed on the receiver side.
Figure 6:
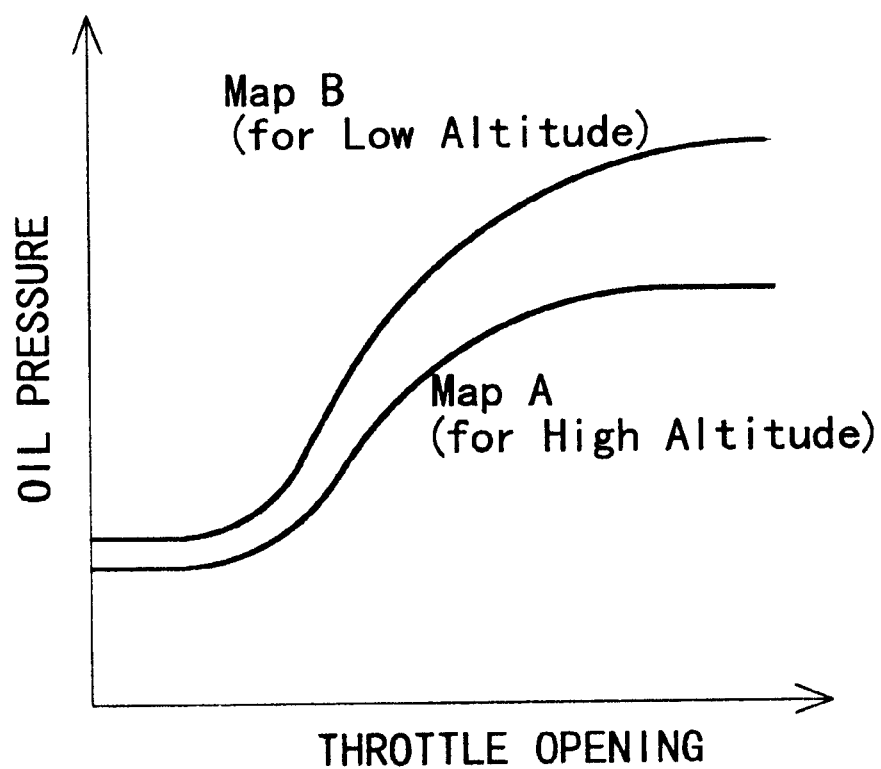
FIG. 6 is a graph showing an oil pressure to be established when an automatic transmission is shifted from its 1st-speed gear position to 2nd-speed gear position.

Referring to FIG. 1 through FIG. 6, there will be described the communication function and abnormality detecting function of one embodiment of the present invention provided between an engine control unit and an automatic transmission control unit. FIG. 1 shows a communications device of one embodiment of the present invention, FIGS. 2($a$) and 2($b$) show output/input pulse waveforms, FIG. 3 is a communication time chart, FIG. 4 is a flow chart of a processing program performed on the transmitter side, FIG. 5 is a flow chart of a processing program performed on the receiver side, and FIG. 6 is a graph used for determining the oil pressure to be established when the transmission is shifted from its 1st-speed gear position to 2nd-speed gear position.

More specifically, FIG. 2($a$) shows pulse signals, and FIG. 2($b$) shows binary signals transmitted through a communication line. In FIG. 3, (a) indicates output signal, (b) indicates transmitted information, (c) indicates input signal, (d) indicates 500-milisecond (ms) counter, (e) indicates 5-second counter, and (f) indicates received information.

In the present embodiment, a binary signal originally formed in the engine control unit 11 is directly received by an operation unit 16 of the automatic transmission control unit 15 through a communication line 20. The operation unit 16 which comprises a central processing unit identifies 1/0 of digital information according to a suitable processing program, and also judges an abnormality of the signal line 20 by detecting that the binary signal ceases to change.

As shown in FIG. 1, an operation unit 12 of the engine control unit 11 communicates with the operation unit 16 of the automatic transmission control unit 15 through the signal line 20. A driver 13 is disposed on the transmitter side of the signal line 20, and resistors 17, 19, and Zener diode 18 are disposed on the receiver side of the line 20. The signal line 20 is raised to power supply voltage VC through the resistor 17. The potential of the signal line 20 is lowered to almost the ground level when the driver 13 is in its ON state, and becomes equal to the power supply voltage VC when the driver 13 is in its OFF state.

Through the signal line 20, 1-bit information as to whether the vehicle is running at a relatively high altitude or at a relatively low altitude (as described later) is transmitted from the engine control unit 11 to the automatic transmission control unit 15.

The engine control unit 11 receives numerous pieces of information from a plurality of sensors and surrounding equipment disposed in an engine 21, and is connected to a plurality of output lines leading to a fuel supply system and surrounding equipment of the engine 21. The operation unit 12 which comprises a central processing unit processes the input information according to processing programs stored therein, and maintains the optimum operating condition of the engine 21 by controlling signals generated to the output lines.

The automatic transmission control unit 15 receives numerous pieces of information from a plurality of sensors and surrounding equipment disposed in an automatic transmission 22, and is connected to a plurality of output lines leading to a plurality of solenoids and surrounding equipment provided in the automatic transmission 22. The operation unit 16 of the control unit 15 processes the input information according to processing programs stored therein, and maintains the optimum operating condition of the automatic transmission 22 by controlling signals generated to the output lines.

Pressure sensor 14 connected to the operation unit 12 of the engine control unit 11 forms an analog voltage corresponding to the current atmospheric pressure. The operation unit 12 reads a digital signal into which the analog voltage is converted, and compares the atmospheric pressure thus detected with a predetermined reference value. If the pressure is less than the reference value, the operation unit 12 determines that the vehicle is running at a relatively high altitude, and forms digital information having a logical value of 1. If the detected atmospheric pressure is equal to or greater than the reference value, the operation unit 12 determines that the vehicle is running at a relatively low altitude, and forms digital information having a logical value of 0.

The operation unit 12 controls the amount of fuel supplied to the engine 21 according to the atmospheric pressure and determination as to whether the vehicle is running at the low altitude or high altitude. At the same time, the operation unit 12 actuates the driver 13 with one of two kinds of pulse signals that differ in the duty ratio depending upon the logical value 1/0 of the digital information, and forms one of two kinds of binary signals in the signal line 20.

As shown in FIG. 2(a), the operation unit 12 on the transmitter side keeps generating a pulse signal in which pulses each having a length of 262 miliseconds are intermittently produced at a frequency of 1310 m sec. when it determines that the vehicle is running at a relatively low altitude. The duty ratio of this pulse signal is 20%. When the operation unit 12 determines that the vehicle is running at a relatively high altitude, on the other hand, it keeps generating a pulse signal in which pulses each having a length of 1048 miliseconds are continuously produced at a frequency of 1310 miliseconds. The duty ratio of this pulse signal is 80%.

The driver 13 reverses the relationship between the H (High)/L(Low) level of voltage of the pulse signal generated by the operation unit 12 and the H/L level of voltage of the signal line 20. When the duty ratio of the pulse signal is controlled to 20% upon determination of the low-altitude vehicle running, the duty ratio associated with the voltage of the signal line 20 becomes 80% though the duty ratio as viewed from a drop of the binary signal at the leading edge of the pulse signal remains 20%, as shown in FIG. 2(b). Similarly, when the duty ratio of the pulse signal is controlled to 80% upon determination of the high-altitude running, the duty ratio associated with the voltage of the signal line 20 becomes 20% though the duty ratio as viewed from a drop of the binary signal at the leading edge of the pulse signal remains 80%.

The operation unit 16 on the receiver side repeatedly reads the binary signal of the signal line 20 according to a processing program installed therein, and starts counting time on the processing program upon detection of the L level at read-in time "t2" subsequent to read-in time "t1" at which the H level was read, as shown in FIG. 2(b). The operation unit 16 then determines the duty ratio from the binary signal read at time "t3" when a first predetermined time (500 miliseconds) elapses from the time "t2", and reproduce the logical value 1/0 of the digital information produced on the transmitter side.

The receiver-side operation unit 16 detects a change (drop) of the binary signal which corresponds to the leading edge (rise) of the pulse signal generated by the transmitter-side operation unit 12, according to a predetermined operation program and predetermined timing. Accordingly, the times "t2", "t3" are irregularly delayed from the time of the rise of the binary signal (voltage drop) in the signal line 20.

As shown in FIG. 3, the transmitter-side operation unit 12 discriminate between low-altitude vehicle running and high-altitude vehicle running based on the output signal from the pressure sensor 14, to form the transmitted information (b), and successively changes the output signal (a) to the driver 13 according to the transmitted information.

The receiver-side operation unit 16 receives the input signal (c) (binary signal) from the signal line 20, and starts counting of 500 miliseconds as indicated at (d) upon detection of the leading edge of the pulse signal. The operation unit 16 then reproduces the original digital information based on the input signal read at points of time indicated by arrows in FIG. 3 that correspond to the times when 500 miliseconds has been counted. The received information (f) is that the vehicle is running at a low altitude if the input signal (c) is at the H (high) level, and that the vehicle is running at a high altitude if the input signal (c) is at the L (low) level. This determination is maintained until the opposite determination is made next time.

Accordingly, the transmitted information on the transmitter side is reflected by the received information on the receiver side only with a delay time equivalent to one cycle of the output signal at the most.

Concurrently with the processing for reproducing the digital information, the receiver-side operation unit 16 starts counting 5 seconds as indicated at (e) in FIG. 3 while resetting the counter each time the rise of the input signal (voltage drop from H level to L level) is detected. If the time counted by the counter (e) reaches 5 seconds, the operation unit 16 determines that the signal line 20 is in an abnormal condition, and sets a fail-safe mode for the automatic transmission.

If the signal line 20 is disconnected at time "tr" with respect to the input signal (c) in FIG. 3, and the voltage of the signal line 20 is not lowered even if the transmitter-side driver 13 is ON, the abnormality of the signal line 20 is judged at the point of time when 5 seconds elapses after detection of the last rise (last voltage drop) of the input signal. Thus, the abnormality of the communication line 20 is caught or detected on the receiver side with a delay of 5 seconds at most after it occurs.

The transmitter-side operation unit 12 forms the binary signal in the communication line 20 by actuating the driver 13 according to the flow chart shown in FIG. 4.

In step 101, the current atmospheric pressure is obtained by reading the output signal from the pressure sensor 14.

In step 102, it is determined whether the current atmospheric pressure is less than a predetermined value. If the pressure is less than the predetermined value, it is determined that the vehicle is running at a relatively high altitude, and the logical value of 1 is selected. If the pressure is equal to or greater than the predetermined value, it is determined that the vehicle is running at a relatively low altitude, and the logical value of 0 is selected.

In step 103, it is determined whether the logical value is 1 or 0. When the logical value is 1, step 105 is executed to send a pulse signal with a duty ratio of 80%. When the logical value is 0, step 104 is executed to send a pulse signal with a duty ratio of 20%.

In step 106, other controls consisting of a series of input and output signal processing and arithmetic processing for controlling the engine 21 are implemented.

The receiver-side operation unit 16 reproduces the logical values 1/0 of the original digital information based on the binary signal in the communication line 20, according to the flow chart of FIG. 5.

In step 121, the voltage of the communication line 20 is read as an input signal into the operation unit 16. Input signal "0" is formed if the voltage is at H level that exceeds a threshold level, and input signal "1" is formed if the voltage is at L level that is less than the threshold level, so that the input signal coincides with the binary, pulse signal generated by the transmitter-side operation unit 12.

In step 122, the operation unit 16 compares the binary signal obtained in the current control cycle with the binary signal obtained in the last control cycle, to detect any reversal from 0 to 1 and recognize passage of the leading edge of the pulse signal generated by the transmitter-side operation part 12.

When the reversal is detected, step 123 is executed to start counting 500 miliseconds, and read in the input signal at the time when 500 miliseconds elapses. At this time, too, input signal "0" is formed if the voltage of the communication line 20 is at H level that exceeds the threshold level, and input signal "1" is formed if the voltage of the line 20 is at L level that is less than the threshold level.

Step 123 is followed by step 125 in which the logical value 1/0 of the input signal is determined.

When the input signal has the logical value "0", step 126 is executed to determine that the switch is OFF, which means that the vehicle is running at a low altitude, and set a switch flag SF to "0". When the input signal has the logical value "1", step 127 is executed to determine that the switch is ON, which means that the vehicle is running at a high altitude, and set the switch flag SF to "1".

If the reversal of the logical value is not detected in step 122, step 124 is executed to reset the counter that counts 5 seconds, and newly start counting so as to determine whether any reversal occurs before 5 seconds elapses.

If the reversal does not appear until 5 seconds elapses, step 128 is executed to determine that the signal line 20 is at fault, and set the switch flag SF to "0" as in the case where the vehicle is running at a low altitude. If another reversal appears before 5 seconds elapses, the control flow goes to step 129.

Step 129 and the following steps are executed to change setting of an oil pressure used for changing gear positions of the transmission, using the switch flag SF that is set as described above.

In step 129, it is determined whether the automatic transmission is being shifted from one gear position to another gear position. If an affirmative decision is obtained in step 129, step 130 is executed to determine if the transmission is being shifted from 1st-speed gear position to 2nd-speed gear position. If a negative decision is obtained in step 129, step 136 is executed to select a map for setting the oil pressure for the non-shifting time when the transmission is not shifted.

If it is determined in step 130 that the transmission is shifted from the 1st-speed to 2nd-speed gear position, step 131 is then executed to determine whether the switch flag SF is "1" or "0".

If the switch flag SF is "1", step 132 is then executed to select Map "A" shown in FIG. 6 which sets the oil pressure at a relatively low level suitable for the vehicle that is running at a relatively high altitude. If the switch flag SF is "0", on the other hand, step 133 is executed to selected Map "B" shown in FIG. 6 which sets the oil pressure at a relatively high level suitable for the vehicle that is running at a relatively low altitude.

When it is determined in step 130 that the transmission is not shifted from the 1st-speed to 2nd-speed gear position, the type of shifting, such as 2nd-speed to 3rd-speed gear change or 3rd-speed to 4th-speed gear change, is specified, and one that corresponds to the value 1/0 of the switch flag is selected from two kinds of oil pressure maps prepared for each type of shifting.

In step 134, the oil pressure map selected in steps 131–133, 135 or 136 is used to control the oil pressure supplied to an engaging element(s) of the automatic transmission 22, while the operation unit 16 performs a series of other controls, such as switching solenoids to effect the desired shifting operation, and maintaining the optimum operating condition of the automatic transmission 22.

In the communications device of the present embodiment, the engine control unit 11 as the transmitter communicates with the automatic transmission control unit 15 as the receiver through the signal line 20, to inform the control unit 15 of whether the vehicle is running at a high altitude or at a low altitude. This eliminates a need to provide the automatic transmission control unit 15 with an exclusive pressure sensor, or to include a control flow for discriminating the high-altitude vehicle running from the low-altitude running in the processing program of the automatic transmission control unit 15.

When the vehicle is running at a high altitude where the engine output is lowered with respect to a given throttle opening as compared with when the vehicle is running at a low altitude, the automatic transmission control unit 15 performs a shifting operation of the automatic transmission 2 by setting the oil pressure at a lower level than that selected at the low altitude, thus assuring almost the same shifting time (period of time for which the clutch is kept being partially engaged) as in the case of low-altitude vehicle running. Thus, the shifting operation can be smoothly accomplished without suffering from shift shocks that would otherwise occur due to rapid engagement of the engaging element.

Further, if the abnormality of the signal line 20 is judged with the abnormality detecting function added, the oil pressure is set at a high level for low-altitude vehicle running upon detection of the abnormality, thereby preventing the oil pressure from being set at a low level for high-altitude running while the vehicle is running at a low altitude with a large engine output, and thus avoiding a prolonged shifting time and an increased burden on the engaging element(s) of the automatic transmission 22.

Since the automatic transmission control unit 15 receives the binary signal itself, rather than the digital information separated from the binary signal in the signal line, the communication abnormality can be detected in the course of program processing, utilizing the characteristic that the binary signal rises at a regular interval.

Namely, in detecting the abnormality, the present device does not need to use a signal other than input and output signals as in the device disclosed in Japanese laid-open Patent Publication No. 1-172668, nor need to determine whether the digital information is correct or not as in the device as disclosed in the same publication.

Further, there is no need to analyze an analog voltage in a plurality of stages as in the case where an analog signal is used.

Moreover, the present communications device does not need a circuit for separating the digital information from a synchronization signal as in the case where a serial communication method is employed to transfer the digital information in association with the synchronization signal.

Thus, the communications device capable of detecting the abnormality can be obtained without adding a special circuit outside the operation unit 16, by merely adding a few steps to the original or inherent program to be performed by the operation unit 16, which steps do not affect the processing of the original program.

In the present embodiment, the analog output of the pressure sensor 14 is converted into a binary signal in the operation unit 12 of the engine control unit 11, and the binary signal indicating the high-altitude/low-altitude running is transmitted to the automatic transmission control unit 15. This means that the pressure sensor 14 and the operation unit 12 function as a unit as a pressure switch for determining whether the vehicle is running at a high altitude or low altitude. The present embodiment, therefore, may be modified such that the pressure sensor 14 itself functions to generate pulse signals having two kinds of duty ratios depending upon its determination on the high-altitude/low-altitude running, and the driver 13 is replaced by a relay or a mechanical switch.

In the present invention, the transmitter is not limited to the control device that implements the program processing of the illustrated embodiment, but may be used to receive an output signal from an exclusive logic circuit, or detect the ON/OFF state of a simple transfer switch or thumb wheel switch. In any event, the 1-bit digital information is not converted to a simple H/L level of voltage, but converted to a duty ratio of a pulse signal and then transmitted, thus requiring only one signal line to transmit the digital information and judging the communication abnormality.

What is claimed is:

1. A communications device for a control device, comprising:

a single signal line communicating with the control device; and a transmitter that transmits a pulse signal including digital information to the control device through said signal line, said transmitter varying a duty ratio of the pulse signal so that the duty ratio corresponds to a logical value 1/0 of the digital information; and wherein said control device reads a binary signal from said signal line at a predetermined frequency based on a first processing program, and processes the binary signal according to the first processing program, said control device comprising:

leading edge detecting means for detecting passage of a leading edge of said pulse signal from a change in the received binary signal; and reproducing means for reproducing said digital information based on the binary signal read at a time when a first predetermined time elapses after the passage of the leading edge of the pulse signal is detected, said first predetermined time being set to be intermediate between the varied duty ratios.

2. A communications device according to claim 1, wherein said transmitter continuously forms said pulse signal at a substantially constant interval in said signal line, and periodically raises said binary signal in the signal line.

3. A communications device according to claim 1, wherein said control device controls a first equipment installed on a motor vehicle according to said first processing program, and said transmitter controls a second equipment installed on the vehicle according to a second processing program independent of said first processing program, said transmitter forming said pulse signal in said signal line according to said second processing program.

4. A communications device according to claim 2 or 3, wherein said control device further comprises diagnosing means for detecting a communication abnormality when said change in the binary signal is not detected for a second predetermined time that is set to be longer than the maximum interval between periodic rises of the binary signal in said signal line.

5. A communications device according to claim 1, wherein said transmitter comprises an engine control unit for controlling an operation of a vehicle engine, and said control device comprises an automatic transmission control unit for controlling an operation of an automatic transmission, and wherein digital information from a sensor that informs whether the vehicle is running at a high altitude or a low altitude is transmitted from said engine control unit to said automatic transmission control unit.

6. A communications device according to claim 5, wherein the digital information comprises atmospheric pressure measurements.

* * * * *